US012346215B2

(12) United States Patent
Natanzon et al.

(10) Patent No.: US 12,346,215 B2
(45) Date of Patent: Jul. 1, 2025

(54) DATA STORAGE ARRANGEMENT AND METHOD FOR ANONYMIZATION AWARE DEDUPLICATION

(71) Applicant: Huawei Technologies Co., Ltd., Shenzhen (CN)

(72) Inventors: Assaf Natanzon, Hod Hasharon (IL); Shay Akirav, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

(21) Appl. No.: 18/185,826

(22) Filed: Mar. 17, 2023

(65) Prior Publication Data

US 2023/0222037 A1 Jul. 13, 2023

Related U.S. Application Data

(63) Continuation of application No. PCT/EP2020/076233, filed on Sep. 21, 2020.

(51) Int. Cl.
G06F 11/14 (2006.01)
G06F 16/174 (2019.01)
G06F 21/62 (2013.01)

(52) U.S. Cl.
CPC ...... *G06F 11/1453* (2013.01); *G06F 16/1752* (2019.01); *G06F 21/6254* (2013.01)

(58) Field of Classification Search
CPC ............ G06F 11/1453; G06F 16/1752; G06F 21/6254; G06F 3/0608; G06F 3/0623; G06F 3/0641; G06F 3/0652; G06F 3/0679; G06F 16/1748
See application file for complete search history.

(56) References Cited

U.S. PATENT DOCUMENTS

| 10,075,291 B1* | 9/2018 | Molaro ................. G06F 16/16 |
| 2005/0138110 A1 | 6/2005 | Redlich et al. |
| 2017/0147446 A1* | 5/2017 | Zhang ................ G06F 11/1453 |
| 2020/0167240 A1* | 5/2020 | Haridas .............. G06F 11/1453 |

FOREIGN PATENT DOCUMENTS

WO 2009029783 A2 3/2009

OTHER PUBLICATIONS

Dictionary.com definition of "anonymize" https://www.dictionary.com/browse/anonymize (Year: 2024).*
Wen Xia et al., A Comprehensive Study of the Past, Present, and Future of Data Deduplication, Proceedings of the IEEE ( vol. 104, Issue: 9, Sep. 2016), Aug. 2, 2016, 30 pages.

* cited by examiner

*Primary Examiner* — Michael Krofcheck
(74) *Attorney, Agent, or Firm* — Conley Rose, P.C.

(57) ABSTRACT

A data storage arrangement includes a memory and a controller, where the controller receives an indication of data to be anonymized. The controller further parses a data element to be stored and generates a copy of one or more data portions to be anonymized. The controller further deletes one or more data portions to be anonymized to generate a modified data element to be stored. The controller further generates a copy of the modified data element to be stored utilizing deduplication. The data storage arrangement thus takes in account data anonymization during deduplication (i.e. an anonymization aware deduplication).

20 Claims, 3 Drawing Sheets

DATA STORAGE ARRANGEMENT AND METHOD FOR ANONYMIZATION AWARE DEDUPLICATION

CROSS-REFERENCE TO RELATED APPLICATIONS

This is a continuation of International Patent Application No. PCT/EP2020/076233 filed on Sep. 21, 2020. The disclosure of the aforementioned application is hereby incorporated by reference in its entirety.

TECHNICAL FIELD

The present disclosure relates generally to the field of data protection and backup, and in particular, to data storage arrangements and methods for anonymization aware deduplication.

BACKGROUND

Typically, data backup is used to protect and recover data in an event of data loss in a primary storage system. Examples of the event of data loss may include, but is not limited to, data corruption, hardware or software failure in the primary storage system, accidental deletion of data, hacking, or malicious attack. Thus, for safety reasons, a separate backup system or a secondary storage (for example a data storage arrangement) is extensively used to store a backup of the data present in the primary storage system.

Data anonymization is used to protect privacy of confidential or private information, such as credit card numbers, social security number. In data anonymization, the confidential or personal data, such as person identifiable information, is often obfuscated so that the people who are associated with the data remain anonymous. However, it is observed that data anonymization manifests an adverse impact on the effectiveness of deduplication as the anonymized data is not deduplicated if the original data is used as a reference. The term deduplication refers generally to eliminating duplicate or redundant information. As the data anonymization changes the data, it is no more same as original data, and thus, increases the backup and deduplication effort. Further, existing deduplication methods, such as variable length deduplication, work well when large identical data chunks appear in a data stream that is to be backed up. However, such existing deduplication methods does not work well if there are frequent changes in the data or the changes are very small. For example, even a change of a character in a chunk may render the data chunk as new chunk, where a conventional deduplication method will not find any identical data chunks, thereby reducing the effectiveness of deduplication. As a result, with time, storage space of the secondary storages become occupied as more duplicate data may be stored which occupy a large storage space in the conventional secondary storages. This is undesirable as it causes reduction in performance of the secondary storages. Moreover, the cost of file storage, with all the associated costs including cost of storage hardware, continues to be a burden.

Therefore, in light of the foregoing discussion, there exists a need to overcome the aforementioned drawbacks associated with conventional data storage systems and methods of deduplication.

SUMMARY

The present disclosure seeks to provide a data storage arrangement and a method for anonymization aware deduplication. The present disclosure seeks to provide a solution to the existing problem of inefficient deduplication associated with data anonymization. An aim of the present disclosure is to provide a solution that overcomes at least partially the problems encountered in other approaches and provide an improved data storage arrangement and method that takes in account data anonymization during deduplication (i.e. an anonymization aware deduplication), which enables an efficient deduplication even in the presence of anonymized data.

The object of the present disclosure is achieved by the solutions provided in the enclosed independent claims. Advantageous implementations of the present disclosure are further defined in the dependent claims.

In one aspect, the present disclosure provides a data storage arrangement comprising a memory and a controller, the memory being configured to store a one or more data elements, and the controller being configured to store at least one of the one or more data elements utilizing deduplication, wherein the data storage arrangement is characterized in that the controller is further configured to receive indication of data to be anonymized, receive the data element to be stored, parse the data element to be stored to find one or more data portions to be anonymized, generate a copy of the one or more data portions to be anonymized, delete the one or more data portions to be anonymized from the data element to be stored, generating a modified data element to be stored, generate a copy of the modified data element to be stored utilizing deduplication, and store the copy of the modified data element to be stored along with the copy of the one or more data portions to be anonymized.

The data storage arrangement of the present disclosure takes in account data anonymization during deduplication (i.e. an anonymization aware deduplication), which enables an efficient deduplication even in the presence of anonymized data. In the data storage arrangement, the one or more data portions to be anonymized is parsed and stored separately by the controller to enable an effective deduplication of the data elements that are received for storing. Moreover, the present disclosure efficiently utilizes the storage space as in the anonymization aware deduplication, duplicate data is not stored, thereby improving system performance in comparison to conventional storages where large amount of storage space is occupied by duplicate data as conventional systems do not take into account presence of anonymized data, which further affects system performance of conventional storages.

In an implementation form, the controller is further configured to store the copy of the modified data element to be stored in a first memory area and to store the one or more data portions to be anonymized in a second memory area.

By virtue of separately storing the copy of the modified data element and one or more data portions to be anonymized, the data storage arrangement enables execution of data deduplication on the modified data element.

In a further implementation form, the controller is further configured to store the one or more data portions to be anonymized appended to the copy of the modified data element to be stored.

By virtue of appending the one or more data portions to be anonymized the data storage arrangement enables in efficient storing and retrieval of the data elements when needed.

In a further implementation form, the controller is further configured to generate a corresponding pointer for each of the one or more data portions to be anonymized and to store the copy of the one or more data portions to be anonymized along with the corresponding pointers.

The pointer for each of the one or more data portions to be anonymized are generated and stored to enable easy retrieval of the data elements. Moreover, the use of pointer also reduces the storage space requirements as compared to conventional systems.

In a further implementation form, the corresponding pointer indicates a location in the data element for the corresponding data portion to be anonymized.

The pointer corresponds to an address where the one or more data portions to be anonymized were originated (i.e. in the data element). As a result of which the data elements can be easily retrieved when needed.

In a further implementation form, the controller is further configured to parse the data element to be stored to find one or more data portions to be anonymized by finding data portions in data fields being specified as fields to be anonymized.

The parsing based on the data fields to be anonymized enables in effective and quick parsing of anonymized data or data to be anonymized from the data elements received. As a result, data deduplication can be implemented spontaneously on the data elements.

In a further implementation form, the controller is further configured to parse the data element to be stored to find one or more data portions to be anonymized by finding data portions having data formats matching anonymous formats.

The parsing based on the formats of data to be anonymized enables to accurately identify and thus effectively parse anonymized data or data to be anonymized from the data elements received. As a result, data deduplication can be implemented effectively on the data elements.

In a further implementation form, the controller is further configured to restore a data element by receiving the copy of the modified data element to be restored along with the copy of one or more anonymized data portions, generating a restored copy of the data element by extracting the modified data element utilizing deduplication extraction, and inserting the one or more anonymized data portions into the restored copy of the data element.

The controller is configured to generate the restored copy of the data element by combining the modified data element with the one or more anonymized data portions. As a result, the data elements are efficiently and accurately retrieved (or restored) when needed.

In another aspect, the present disclosure provides a method for a data storage arrangement comprising a memory being configured to store a one or more data elements, and the method comprising storing at least one of the one or more data elements utilizing deduplication, wherein the method is characterized in that the method further comprises receiving indication of data to be anonymized, receiving the data element to be stored, parsing the data element to be stored to find one or more data portions to be anonymized, generating a copy of the one or more data portions to be anonymized, deleting the one or more data portions to be anonymized from the data element to be stored, generating a modified data element to be stored, generating a copy of the modified data element to be stored utilizing deduplication, and storing the copy of the modified data element to be stored along with the copy of the one or more data portions to be anonymized.

The method of the present disclosure takes in account data anonymization during deduplication (i.e. an anonymization aware deduplication), which enables an efficient deduplication even in the presence of anonymized data. In the method, the one or more data portions to be anonymized is parsed and stored separately to enable an effective deduplication of the data elements that are received for storing. Moreover, the method of the present disclosure efficiently utilizes the storage space as in the anonymization aware deduplication, duplicate data is not stored, thereby improving performance in comparison to conventional methods where large amount of storage space is occupied by duplicate data as conventional methods do not take into account presence of anonymized data.

In an implementation form, the method further comprises restoring a data element by receiving the copy of the modified data element to be restored along with the copy of one or more anonymized data portions, generating a restored copy of the data element by extracting the modified data element utilizing deduplication extraction, and inserting the one or more anonymized data portions into the restored copy of the data element.

The method enables in generating the restored copy of the data element by combining the modified data element with the one or more anonymized data portions. As a result, the data elements are efficiently retrieved by the method when needed.

In yet another aspect, the present disclosure provides a computer-readable medium carrying computer instructions that when loaded into and executed by a controller of a data storage arrangement enables the data storage arrangement to implement the method of the previous aspect.

The computer-readable medium of the present disclosure enables in executing data deduplication on data having anonymized data or data that is to be anonymized in comparison to conventional storages where data deduplication is not possible or not effective for data having anonymized data.

In another aspect, the present disclosure provides a data storage arrangement comprising a memory being configured to store a one or more data elements, and the data storage arrangement further comprising a deduplication storing software module for storing at least one of the one or more data elements utilizing deduplication, wherein the data storage arrangement is characterized in that the data storage arrangement further comprises a software module for receiving indication of data to be anonymized, a software module for receiving the data element to be stored, a software module for parsing the data element to be stored to find one or more data portions to be anonymized, a software module for generating a copy of the one or more data portions to be anonymized, a software module for deleting the one or more data portions to be anonymized from the data element to be stored, generating a modified data element to be stored, a software module for generating a copy of the modified data element to be stored utilizing deduplication, and a software module for storing the copy of the modified data element to be stored along with the copy of the one or more data portions to be anonymized.

The data storage arrangement by use of the software modules of the present disclosure takes in account data anonymization during deduplication (i.e. an anonymization aware deduplication), which enables an efficient deduplication even in the presence of anonymized data. In the data storage arrangement, the one or more data portions to be anonymized is parsed and stored separately by the software modules to enable an effective deduplication of the data elements that are received for storing. Moreover, the present disclosure efficiently utilizes the storage space as in the anonymization aware deduplication, duplicate data is not stored, thereby improving system performance in comparison to conventional storages.

In an implementation form, data storage arrangement further comprising a data element restoring software module for restoring a data element comprising a data element receiving software module for receiving the copy of the modified data element to be restored along with the copy of one or more anonymized data portions, a deduplication extraction software module for generating a restored copy of the data element by extracting the modified data element utilizing deduplication extraction, and an insertion software module for inserting the one or more anonymized data portions into the restored copy of the data element.

The restoring software module generates the restored copy of the data element by combining the modified data element with the one or more anonymized data portions. As a result, the data elements are efficiently retrieved when needed.

It is to be appreciated that all the aforementioned implementation forms can be combined.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
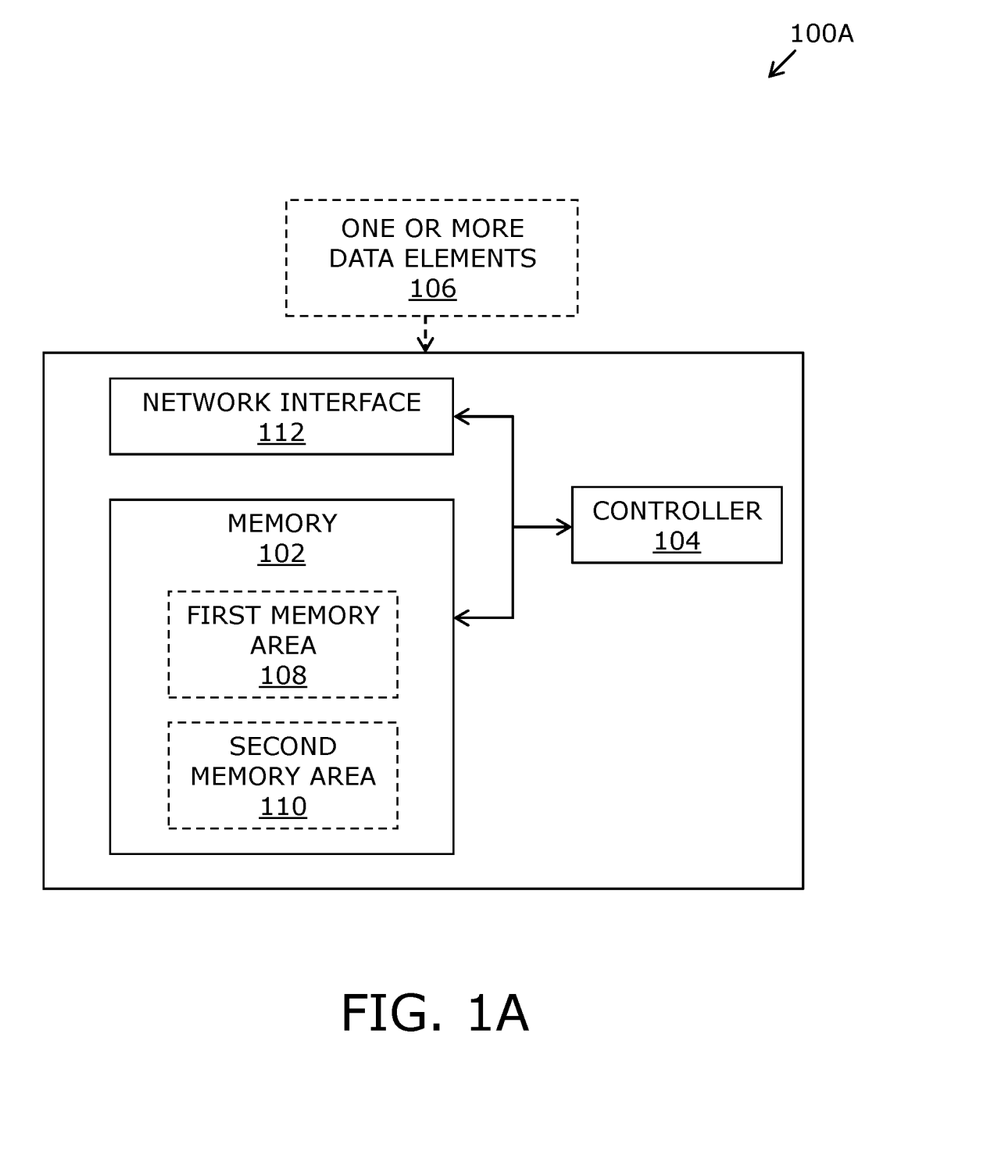
FIG. 1A is a block diagram of a data storage arrangement for anonymization aware deduplication, in accordance with an embodiment of the present disclosure.

FIG. 1A is a block diagram of a data storage arrangement, in accordance with an embodiment of the present disclosure. With reference to FIG. 1A there is shown a data storage arrangement 100A. The data storage arrangement 100A includes a memory 102 and a controller 104. In an implementation, the memory 102 includes a first memory area 108 and a second memory area 110, and the data storage arrangement 100A further includes a network interface 112.

In one aspect, the present disclosure provides the data storage arrangement 100A comprising the memory 102 and the controller 104, the memory 102 being configured to store a one or more data elements 106, and the controller 104 being configured to store at least one of the one or more data elements 106 utilizing deduplication, wherein the data storage arrangement 100A comprises the controller 104 that is further configured to receive indication of data to be anonymized, receive the data element to be stored, parse the data element to be stored to find one or more data portions to be anonymized, generate a copy of the one or more data portions to be anonymized, delete the one or more data portions to be anonymized from the data element to be stored, generating a modified data element to be stored, generate a copy of the modified data element to be stored utilizing deduplication, and store the copy of the modified data element to be stored along with the copy of the one or more data portions to be anonymized.

The memory 102 refers to a hardware storage of the data storage arrangement 100A. The memory 102 includes suitable logic, circuitry, or interfaces that are configured to store one or more data elements 106, pointers and other data based on instructions received from the controller 104. Moreover, the memory 102 may be configured to further store instructions executable by the controller 104. Examples of implementation of the memory 102 may include, but are not limited to, electrically erasable programmable read-only memory (EEPROM), random-access memory (RAM), read-only memory (ROM), hard disk drive (HDD), flash memory, solid-state drive (SSD), and/or central processing unit (CPU) cache memory. The memory 102 may store an operating system and/or other program products (including one or more operation algorithms) to operate the data storage arrangement 100A. Each of the first memory area 108 and the second memory area 110 refers to a block or a file or other relevant storage area in the memory 102.

The one or more data elements 106 refers to incoming information or data stream that arrive at the data storage arrangement 100A. For example, the one or more data elements 106 may arrive as an input/output (I/O) request during deduplication process (i.e. when backup is performed from a primary storage system (e.g. a host server) to a secondary storage system, such as the data storage arrangement 100A. In an example, the one or more data elements 106 potentially includes personal data, such as personal identifiable data or data that may be subject to data privacy and security under various regulations or data protection laws, such as Data Protection Act (DPA). The one or more data elements 106 may be a structured data, such as with defined fields, such as name, age, phone number, credit card number, address and the like. For example, the one or more data elements 106 may include a string of characters as "Dani, 33, 0541111111, 4580800080001999, A street" representing fields name, age, phone number, credit card number, and address fields in a sequence. In another example, the one or more data elements 106 may be unstructured data where the data that needs to be anonymized may appear at any place in data set without specific field or known location.

The network interface 112 includes suitable logic, circuitry, and/or interfaces that may be configured to communicate with one or more external devices, such as user devices or servers. Examples of the network interface 112 may include, but is not limited to, a network interface card (NIC), an antenna, a radio frequency (RF) transceiver, or network ports.

The controller 104 is configured to store at least one of the one or more data elements 106 utilizing deduplication. In an implementation, the controller 104 is configured to execute instructions stored in the memory 102. In an example, the controller 104 may be a general-purpose processor. Examples of the controller 104 may include, but is not limited to a microprocessor, a microcontroller, a complex instruction set computing (CISC) processor, an application-specific integrated circuit (ASIC) processor, a reduced instruction set computer (RISC) processor, a very long instruction word (VLIW) processor, a CPU, a state machine, a data processing unit, and other processors or control circuitry. Moreover, the controller 104 may refer to one or more individual processors, processing devices, a processing unit that is part of a machine, such as the data storage arrangement 100A. The controller 104 is configured to store the at least one of the one or more data elements 106 utilizing deduplication. Deduplication enables the data storage arrangement 100A to prevent storing of duplicate data in secondary storage, such as the memory 102. As a result, a large amount of storage space is saved which further improves system performance of the data storage arrangement 100A. In an example, the data storage arrangement 100A refers to a secondary storage. The at least one data element of the one or more data elements 106 stored using deduplication may be confidential data such as a credit card number, a social security number or any other personal information.

In operation, the controller 104 is configured to receive an indication of data to be anonymized. The anonymization of data refers to a process of information sanitization, executed by the controller 104, to enable protection of privacy. It is the process of either encrypting, obfuscating or removing personally identifiable information from one or more data elements 106, so that people associated with the data remain anonymous. The indication of data to be anonymized may be provided by a user. In an example, the controller 104 may be configured to receive a user input that is an indication to which setting or configuration to select for identifying sensitive data. For example, a user may configure which anonymization is likely applied to the data, such as General Data Protection Regulation (GDPR) anonymization, anonymization of a portion, such as credit card numbers only, and the like, as per need. Such settings and configurations which are selected or configured may be prestored in the memory 102.

The controller 104 is further configured to receive the data element to be stored. The data element to be stored may be received by the controller 104 from an external device that is communicatively coupled to the data storage arrangement 100A via a communication network. The data storage arrangement 100A may be a secondary storage for storing backup of data of user devices or primary storage system(s). In an example, the data storage arrangement 100A is configured to store data of a plurality of user devices or host server in an organization. In an example, the data element may be received at the time of backup to perform deduplication. The data element corresponds to the one or more data elements 106.

In an example, the data element to be stored that is received by the controller 104 is given below in table (1) (in practice such a table may have millions of lines).

TABLE 1

| Name | Age | Phone Number | Credit Card Number | Address |
|------|-----|--------------|--------------------|---------|
| Dani | 33 | 0541111111 | 4580800080001999 | A street |
| Josef | 55 | 0541222222 | 4580123434001999 | B street | wherein name is of 64 characters, age is of 3 characters, phone number is of 10 characters, credit card number is of 16 characters, address of 64 characters. In another example, the data element to be stored that is received by the controller 104 is an alphanumeric character string: Dani, 33, 0541111111, 4580800080001999, A street; Josef, 55, 0541222222, 4580123434001999, B street.

The controller 104 is further configured to parse the data element to be stored to find one or more data portions to be anonymized. The controller 104 is configured to parse the data element to be stored based on the received indication (i.e. user configuration) for anonymization of the data. In an example, algorithms used by controller 104 for detection of which data is sensitive (i.e. confidential) potentially work based on the configuration received by the controller 104 from the user. For example, in a case where the data element is a structured data, in which a location of a given data field is predefined or known, it is parsed accordingly. For instance, in the data element received by the controller 104, credit card numbers data field is identified at start offset '67' (16 characters) and start offset '224' (16 characters) from the start of the alphanumeric character string. In another example, patterns may be used based on user configurations and rules to identify the one or more data portions (e.g. sensitive data) to be anonymized. Beneficially, the one or more data portions to be anonymized is parsed by the controller 104 to enable efficient deduplication of the data element that is received by the controller 104 for storing. In conventional technologies where the data portions to be anonymized are not parsed from the data elements, and thus deduplication is inefficient.

According to an embodiment, the controller 104 is further configured to parse the data element to be stored to find one or more data portions to be anonymized by finding data portions in data fields being specified as fields to be anonymized. Data fields herein refer to broad categories of the data where similar data can be stored in a structured form. In an example, the data fields may be name, age, phone number, credit card number, residential address in which credit card number may be identified as field to be anonymized. In such an example, the data elements of the data field: credit card number is parsed and stored to be anonymized.

According to an embodiment, the controller 104 is further configured to parse the data element to be stored to find one or more data portions to be anonymized by finding data portions having data formats matching anonymous formats. Data formats herein refer to a defined format for the data elements such as number of characters or number of alphabets or number of numeric values used, or certain patterns. The controller 104 is configured to receive the anonymous formats (i.e. user-specified formats) from the user. In an example, parsing the data element by finding data portions having data formats matching user-specified formats is executed by understanding the format of the data elements if the data that is received is structured, not structured, or have some unique patterns. In an example, data formats of data such as credit card number may have a unique format of numbers only of specified length, such as 16 digits or age has a format of 1 or 2 digits. The credit card numbers have very special format and checksum built in which helps in finding of data formats of credit card numbers. Like credit card numbers, unique patterns may be identified for data that is to be anonymized to segregate such data portion(s).

The controller 104 is further configured to generate a copy of the one or more data portions to be anonymized. The copy of the one or more data portions to be anonymized is generated to enable the controller 104 to separate the data portions to be anonymized from the rest of the data element received by the controller 104. In an example, the copy of the one or more data portions to be anonymized is generated based on a start offset and an end offset of the data portion. In an example, in the data elements received by the controller 104, credit card numbers are identified at start offset '67' and end offset '224' and thus a copy of the data portion (of length 16 digits/characters) between offset '67' and offset '224' is generated.

According to an embodiment, the one or more data portions may be anonymized before being parsed. As a result, a copy of the one or more data portions which is already anonymized is generated. In an example, the controller 104 may include an algorithm to execute the anonymization of data portions. Such algorithms identify the data portions to be anonymized based on the received indication of data to be anonymized.

In an example, the data elements (before anonymization) that received by controller 104 may be represented as: Dani, 33, 0541111111, 4580800080001999, A street, Josef, 55, 0541222222, 4580123434001999, B street. Further, upon execution of algorithm for anonymization the data elements (after anonymization) may be represented as: Dani, 33, 0541111111, 1111222233334444, A street, Josef, 55, 0541222222, 1111222233334444, B street. In such an example, the data format of 16 numeric digits is identified as data format for anonymization.

In another example, the data element (before anonymization) that received by controller 104 may be represented by the table 2 given below. Further, upon execution of algorithm for anonymization the data elements (after anonymization) may be represented by the table 3 given below (only credit cards numbers are anonymized here). The width of the table is just 157 characters (i.e. name is 64 characters, age is 3 characters, phone number is 10 characters, credit card number is 16 characters and address is 64 characters). In conventional technologies, variable size deduplication will not be able to identify identical blocks, and thus deduplication between the table 1 and table 2 will be zero and further as the tables may have millions of lines, the storage space may be inefficiently utilized. However, in the data storage arrangement 100A, the one or more data portions to be anonymized or the one or more data portions already anonymized is parsed from the data elements received by the controller 104. As a result, deduplication is efficiently executed by the data storage arrangement 100A resulting in efficient utilization of the storage space.

TABLE 2

| Name | Age | Phone Number | Credit Card Number | Address |
|---|---|---|---|---|
| Dani | 33 | 0541111111 | 4580800080001999 | A street |
| Josef | 55 | 0541222222 | 4580123434001999 | B street |

TABLE 3

| Name | Age | Phone Number | Credit Card Number | Address |
|---|---|---|---|---|
| Dani | 33 | 0541111111 | 1111222233334444 | A street |
| Josef | 55 | 0541222222 | 1111222233334444 | B street |

The controller 104 is further configured to delete the one or more data portions to be anonymized from the data element to be stored, generating a modified data element to be stored. The data portions identified as data to be anonymized is separated from the rest of the data and a pointer to where the data was originally is kept. Data deduplication may now be implemented on the modified data element to identify duplicate data element in comparison to conventional technologies where duplicate data elements are identified as new data elements due to presence of anonymized data in the data elements in conventional technologies.

The controller 104 is further configured to generate a copy of the modified data element to be stored utilizing deduplication. The copy of the modified data element is stored separately from the copy of the one or more data portions to be anonymized to enable identification of duplicate data elements.

In an exemplary implementation, the data received by the controller 104 is represented as: Dani (64 bytes), 33 (3 bytes), 0541111111 (10 bytes), 4580800080001999 (16 bytes), A street (64 bytes), Josef (64 bytes), 55 (3 bytes), 0541222222 (10 bytes), 4580123434001999 (16 bytes), B street (64 bytes). In such as example, 16-digit credit card number is identified at offset '67' and offset '224', parsed, and separated. As a result, the modified data element is represented as: Dani (64 bytes), 33 (3 bytes), 0541111111 (10 bytes), A street (64 bytes), Josef (64 bytes), 55 (3 bytes), 0541222222 (10 bytes), B street (64 bytes) and data portions to be anonymized is represented as: 4580800080001999 (offset '67'), 4580123434001999 (offset '224').

In another exemplary implementation when the data received by the controller 104 has anonymized data, is represented as: Dani (64 bytes), 33 (3 bytes), 0541111111 (10 bytes), 1111222233334444 (16 bytes), A street (64 bytes), Josef (64 bytes), 55 (3 bytes), 0541222222 (10 bytes), 1111222233334444 (16 bytes), B street (64 bytes). In such as example, 16-digit credit card number is identified at offset '67' and offset '224', parsed and separated. As a result, the modified data element is represented as: Dani (64 bytes), 33 (3 bytes), 0541111111 (10 bytes), A street (64 bytes), Josef (64 bytes), 55 (3 bytes), 0541222222 (10 bytes), B street (64 bytes) and data portions already anonymized is represented as: 1111222233334444 (offset '67'), 1111222233334444 (offset '224').

In accordance with an embodiment, the modified data element further goes through variable length deduplication. The modified data element is chunked into different variable sized chunks (i.e. variable data chunks) based on a chunking algorithm. Further, the controller 104 is further configured to hash each chunk using a hashing algorithm. Thus, each chunk has a hash signature which is generated using the hashing algorithm. In an example, content-based hashing algorithm, such as a Rabin hash, may be used to segregate the data element on locations based on the content of data element. Further, if the hash signature of the chunks is identical to the hash signatures of the chunks previously stored in the data storage arrangement 100A then the modified data element is identified as a duplicate data element and only a pointer to the chunk is stored (identical chunks are not stored), which significantly reduces the storage space as compared to conventional systems and methods. In case where hash signature of a given chunk is not identical to the hash signatures of the chunks previously stored in the memory 102, then the chunk is stored in the memory 102 and a hash of the new chunk is added to the previous hash signatures.

The controller 104 is further configured to store the copy of the modified data element to be stored along with the copy of the one or more data portions to be anonymized. The data portions which are suspected to be anonymized or the data portions which are identified and anonymized are stored separately. In comparison, the conventional storages store such data elements directly without any separation from data portions which are anonymized or data portions which are to be anonymized. As a result conventional storages store duplicate data elements. However, the data storage arrangement 100A of the present disclosure, stores the data portions which are anonymized or data portions which are to be anonymized separately from the other data portions of the data elements received. As a result the data storage arrangement 100A prevents storing of duplicate data elements.

According to an embodiment, the controller 104 is further configured to store the copy of the modified data element to be stored in the first memory area 108 and to store the one or more data portions to be anonymized in the second memory area 110. The copy of the modified data element and one or more data portions to be anonymized are stored separately to enable execution of data deduplication on the modified data element. In comparison to conventional technologies where the data elements received are directly stored without parsing and removing of the one or more data portions resulting in no data deduplication or ineffective deduplication.

According to an embodiment, the controller 104 is further configured to store the one or more data portions to be anonymized appended to the copy of the modified data element to be stored. The one or more data portions to be anonymized are appended to copy of the modified data element to be stored to enable efficient storing and retrieval of the data elements when needed. For example, some association is defined between the one or more data portions to be anonymized and the copy of the modified data element for accurate restoring when requested by a user.

In some implementations, the controller 104 is further configured to generate a corresponding pointer for each of the one or more data portions to be anonymized and to store the copy of the one or more data portions to be anonymized along with the corresponding pointers. The pointer for each of the one or more data portions to be anonymized are generated and stored to enable getting back of the original data (i.e. data element received) during retrieval of the data elements.

According to an embodiment, the corresponding pointer indicates a location in the data element for the corresponding data portion to be anonymized. The pointer corresponds to an address where the one or more data portions to be anonymized were originated (i.e. in the data element). As a result, such data portion that are anonymized can be inserted back to its original position (or location) in the data element, and thus the data element can be easily retrieved (restored) when needed.

According to an embodiment, the controller 104 is further configured to restore a data element by receiving the copy of the modified data element to be restored along with the copy of one or more anonymized data portions, generating a restored copy of the data element by extracting the modified data element utilizing deduplication extraction, and inserting the one or more anonymized data portions into the restored copy of the data element. In an example, the controller 104 restores the data element upon receiving a restore request from a user (e.g. via a user device or a host server). Based on the restore request, the controller 104 retrieves the copy of the modified data element to be restored along with the copy of one or more anonymized data portions from the memory 102. The controller 104 is configured to generate the restored copy of the data element by combining the modified data element with the one or more anonymized data portions. In an example, if the modified data element which was previously stored was duplicate and only address of an original data element was stored, then the original data element is received by the controller 104 and the one or more anonymized data portions is inserted at suitable positions in the data element.

Beneficially, the data storage arrangement 100A of the present disclosure takes in account data anonymization during deduplication, which enables an efficient deduplication even in the presence of anonymized data. The data deduplication enables in efficient utilization of the storage space of the memory 102 of the data storage arrangement 100A as duplicate data is not stored, thereby improving system performance.

Figure 1B:
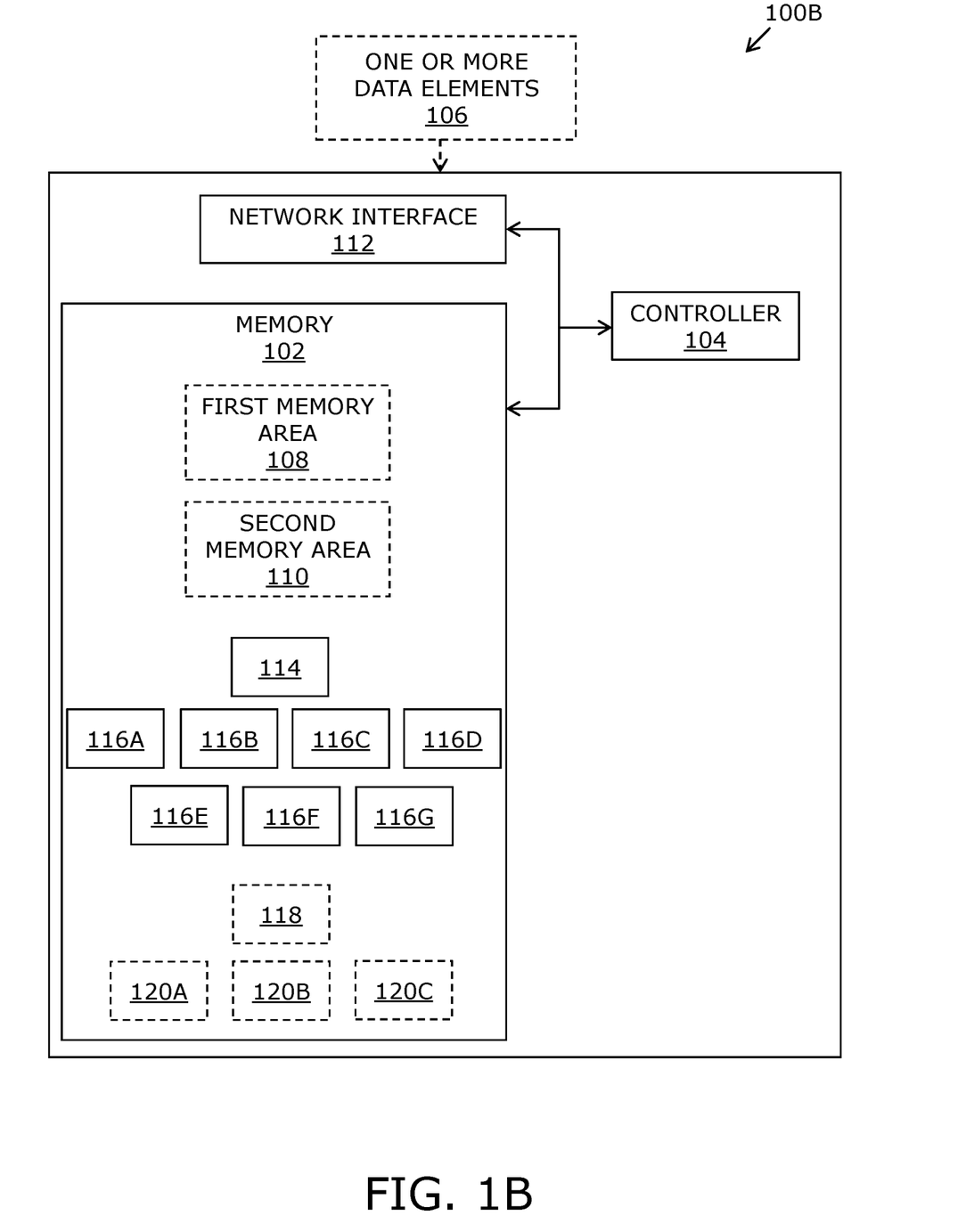
FIG. 1B is a block diagram of a data storage arrangement for anonymization aware deduplication, in accordance with another embodiment of the present disclosure.

FIG. 1B is a block diagram of a data storage arrangement, in accordance with yet another embodiment of the present disclosure. With reference to FIG. 1B there is shown a data storage arrangement 100B. The data storage arrangement 100B further includes a deduplication storing software module 114 and software modules 116A to 116G that are installed in the memory 102. The data storage arrangement 100B further includes a data element restoring software module 118 which further includes a data element receiving software module 120A, a deduplication extraction software module 120B, and an insertion software module 120C. There is further shown the controller 104 and the network interface 112.

In another aspect the present disclosure provides a data storage arrangement 100B comprising a memory 102 being configured to store a one or more data elements 106, and the data storage arrangement 100B further comprising a deduplication storing software module 114 for storing at least one of the one or more data elements 106 utilizing deduplication, wherein the data storage arrangement 100B further comprises a software module 116A for receiving indication of data to be anonymized, a software module 116B for receiving the data element to be stored, a software module 116C for parsing the data element to be stored to find one or more data portions to be anonymized, a software module 116D for generating a copy of the one or more data portions to be anonymized, a software module 116E for deleting the one or more data portions to be anonymized from the data element to be stored, generating a modified data element to be stored, a software module 116F for generating a copy of the modified data element to be stored utilizing deduplication, and a software module 116G for storing the copy of the modified data element to be stored along with the copy of the one or more data portions to be anonymized.

The deduplication storing software module 114 when executed by the controller 104 is configured for storing at least one of the one or more data elements 106 utilizing deduplication. Deduplication is executed on the one or more data elements 106 that are received for storing by the data storage arrangement 100B. One or more data portions that are to be anonymized among the one or more data elements that are received, are parsed from the one or more data elements and further the deduplication is executed by the deduplication storing software module 114 on the remaining data elements (i.e. modified data element). In an example, variable size deduplication is executed by the deduplication storing software module 114. In such an example, the modified data element is chunked. Further, each chunk will have a hash signature which is generated using a hashing algorithm. Further, if the hash signature of the chunks is identical to the hash signatures of the chunks previously stored then the modified data element is identified as a duplicate data element and, a pointer to the chunk will be stored.

In an exemplary implementation, the deduplication storing software module 114 may include the software modules 116A to 116G. In an implementation, the deduplication storing software module 114 (which includes the software modules 116A to 116G) are potentially implemented as separate circuits in the data storage arrangement 100B. Alternatively, in another implementation, the deduplication storing software module 114 is implemented as a circuitry to execute various operations of software modules 116A to 116G. In an implementation, the software modules 116A to 116G may be operationally communicatively coupled to each other and are executed by the controller 104 of the data storage arrangement 100B to perform their respective operations.

The data storage arrangement 100B comprises the software module 116A, which when executed, receives indication of data to be anonymized. The indication of data to be anonymized is received when the software module 116A is executed by the controller 104. The indication refers to a user input received by the controller 104. The user input is provided by a user as the indication via the software module 116A. For example, the software module 116A may be a graphical user interface rendered on a display associated with the data storage arrangement 100B. The user may provide the user input that indicates selection of a specific user configuration or setting that indicates how to identify or which configuration is suited for the data to be anonymized.

The data storage arrangement 100B comprises the software module 116B, which when executed, receives the data element to be stored. The data element to be stored may be received by the network interface 112 when the software module 116B is executed by the controller 104.

The data storage arrangement 100B comprises the software module 116C, which when executed, parses the data element to be stored to find one or more data portions to be anonymized. The data elements to be stored are parsed when the software module 116C is executed by the controller 104. The software module 116C may include a parser to parse the data element to be stored. The parser may find all data portions or chunks which are to be anonymized. The software module 116C is configured to parse the data element to be stored based on the received indication for anonymization of the data by the software module 116A. In an example, the software module 116C when executed by the controller 104 parses the data element based on data fields to be anonymized. In another example, the software module 116C parses the data element based on data formats matching anonymous formats.

The data storage arrangement 100B comprises the software module 116D, which when executed by the controller 104, generates a copy of the one or more data portions to be anonymized. The copy of the one or more data portions to be anonymized is generated by the software module 116D when executed by the controller 104 to separate the data portions to be anonymized from the rest of the data element received by the software module 116B.

The data storage arrangement 100B comprises the software module 116E, which when executed by the controller 104, deletes the one or more data portions to be anonymized from the data element to be stored, generating a modified data element to be stored. The data portions identified as data to be anonymized is separated from the rest of the data by the software module 116E when executed by the controller 104 and a pointer to where the data originally located is retained. Data deduplication may now be implemented on the modified data element to identify duplicate data element.

The data storage arrangement 100B comprises the software module 116F, which when executed by the controller 104, generates a copy of the modified data element to be stored utilizing deduplication. The copy of the modified data element is stored separately from the copy of the one or more data portions to be anonymized by the software module 116F when executed by the controller 104 to enable identification of duplicate data elements.

The data storage arrangement 100B comprises the software module 116G, which when executed by the controller 104, stores the copy of the modified data element to be stored along with the copy of the one or more data portions to be anonymized. The data portions which are suspected to be anonymized or the data portions which are identified and anonymized are stored separately by the software module 116G.

According to an embodiment, the data storage arrangement 100B further comprising a data element restoring software module 118 for restoring a data element comprising a data element receiving software module 120A for receiving the copy of the modified data element to be restored along with the copy of one or more anonymized data portions, a deduplication extraction software module 120B for generating a restored copy of the data element by extracting the modified data element utilizing deduplication extraction, and an insertion software module 120C for inserting the one or more anonymized data portions into the restored copy of the data element. In an example, the data element restoring software module 118 when executed by the controller 104 restores the data element upon receiving a restore request from a user via a user device. Based on the restore request, the data element receiving software module 120A when executed by the controller 104 receives the copy of the modified data element to be restored along with the copy of one or more anonymized data portions from the memory 102. If the modified data element which was previously stored was duplicate and only address of an original data element was stored, then the original data element is received via the network interface 112 by the deduplication extraction software module 120B when executed by the controller 104. The insertion software module 120C when executed by the controller 104 is configured to generate the restored copy of the data element by combining the modified data element with the one or more anonymized data portions.

Beneficially, the software modules 118A to 118G of the present disclosure enables in efficient and effective deduplication of the data elements which have one or more data portions to be anonymized. As a result, the data storage arrangement 100B utilizes reduced storage space of the memory 102 (e.g. secondary storage).

Figure 2:
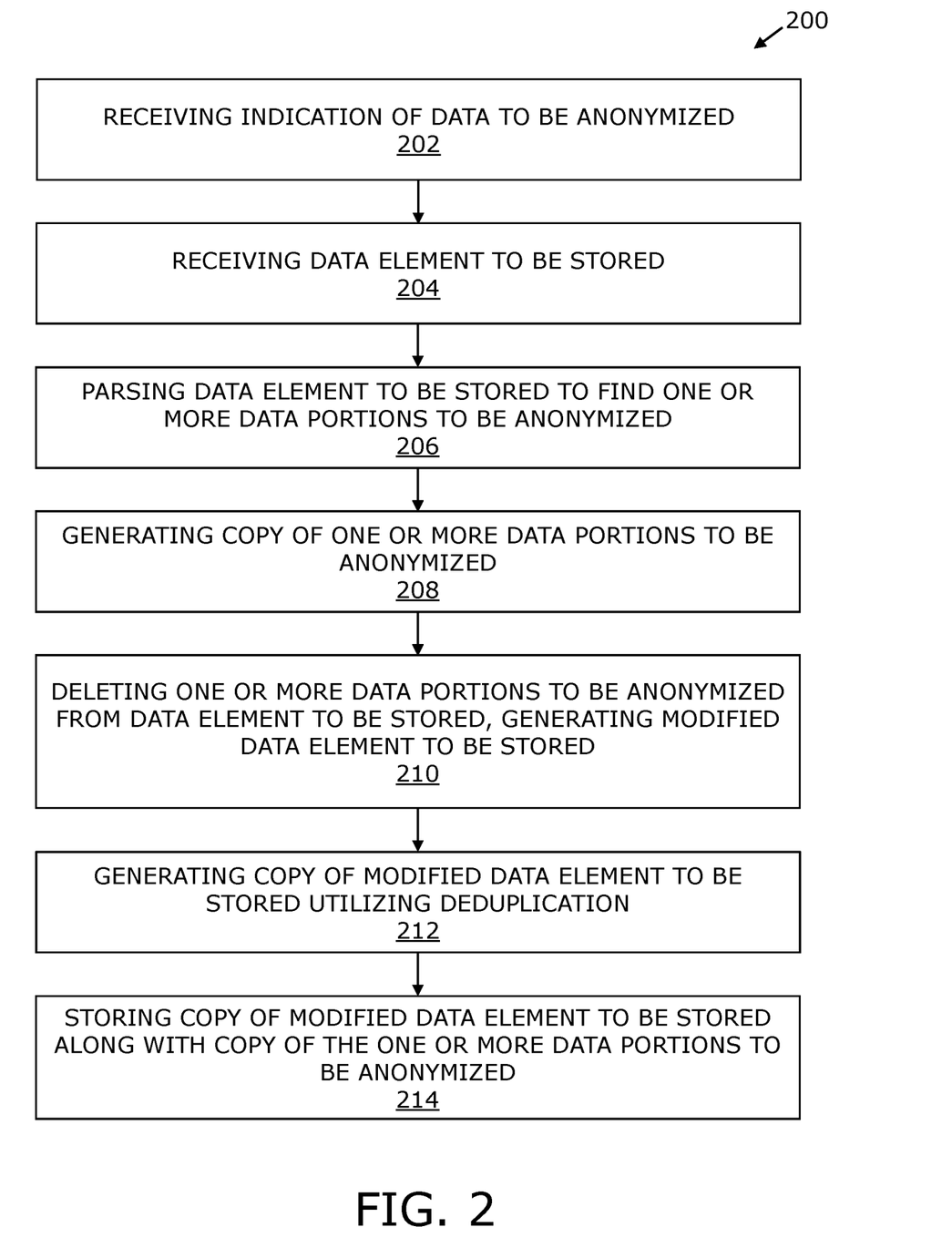
FIG. 2 is a flowchart of a method for a data storage arrangement for anonymization aware deduplication, in accordance with an embodiment of the present disclosure.

FIG. 2 is a flowchart of a method for a data storage arrangement, in accordance with an embodiment of the present disclosure. The method 200 is executed at a data storage arrangement (e.g. the data storage arrangement 100A or 100B) described, for example, in FIG. 1. The method 200 includes steps 202 to 214.

In one aspect the present disclosure provides a method 200 for a data storage arrangement (e.g. the data storage arrangement 100A or 100B) comprising a memory 102 being configured to store a one or more data elements 106, and the method 200 comprising storing at least one of the one or more data elements 106 utilizing deduplication, wherein the method 200 further comprises receiving indication of data to be anonymized, receiving the data element to be stored, parsing the data element to be stored to find one or more data portions to be anonymized, generating a copy of the one or more data portions to be anonymized, deleting the one or more data portions to be anonymized from the data element to be stored, generating a modified data element to be stored generating a copy of the modified data element to be stored utilizing deduplication, and storing the copy of the modified data element to be stored along with the copy of the one or more data portions to be anonymized.

At step 202, the method 200 comprises receiving indication of data to be anonymized. The indication of data to be anonymized is received by a data storage arrangement (e.g. the data storage arrangement 100A or 100B). The indication of data to be anonymized may be provided by a user. In an example, a user input may be received that is an indication to which setting or configuration to select for identifying sensitive data. Such settings and configurations which are selected or configured may be prestored in the memory.

At step 204, the method 200 further comprises receiving the data element to be stored. The controller 104 is configured to receive the data element to be stored via the network interface 112 of the data storage arrangement (e.g. the data storage arrangement 100A or 100B). The data element to be stored may be received by the controller 104 from an external device (e.g. a primary storage) that is communicatively coupled to the data storage arrangement (e.g. the data storage arrangement 100A or 100B) via a communication network.

At step 206, the method 200 further comprises parsing the data element to be stored to find one or more data portions to be anonymized. The parsing of the data element may be executed by the controller 104 of the data storage arrangement (e.g. the data storage arrangement 100A or 100B) for example via a parser. The parsing of the data element to be stored is executed based on the received indication (i.e. user configuration) for anonymization of the data. In an example, algorithms used by controller 104 for detection of which data is sensitive (i.e. confidential) potentially work based on the configuration received by the controller 104 from the user (i.e. the user input).

According to an embodiment, the parsing of the data element is executed to find one or more data portions to be anonymized by finding data portions in data fields being specified as fields to be anonymized. In an example, the data fields may be name, age, phone number, credit card number, residential address in which credit card number may be identified as field to be anonymized.

According to an embodiment, the parsing of the data element is executed to find one or more data portions to be anonymized by finding data portions having data formats matching anonymous formats. In an example, parsing the data element by finding data portions having data formats matching anonymous formats is executed by understanding the format of the data elements if the data that is received is structured, not structured, or have some unique patterns.

At step 208, the method 200 further comprises generating a copy of the one or more data portions to be anonymized. The copy of the one or more data portions to be anonymized is generated by the controller 104 to enable separating the data portions to be anonymized from the rest of the data element that is received. In an example, the copy of the one or more data portions to be anonymized is generated based on a start offset and an end offset of the data portion which defines the start and end of the one or more data portions to be anonymized (please note in the credit card example there are two start point, each start point has 16 characters after it of the credit card data.)

At step 210, the method 200 further comprises deleting the one or more data portions to be anonymized from the data element to be stored, generating a modified data element to be stored. The data portions identified as data to be anonymized is separated from the rest of the data and a pointer to where the data was originally is kept by the controller 104. Data deduplication may now be implemented on the modified data element to identify duplicate data element.

At step 212, the method 200 further comprises generating a copy of the modified data element to be stored utilizing deduplication. The copy of the modified data element is stored separately from the copy of the one or more data portions to be anonymized to enable identification of duplicate data elements.

At step 214, the method 200 further comprises storing the copy of the modified data element to be stored along with the copy of the one or more data portions to be anonymized. The data portions which are suspected to be anonymized or the data portions which are identified and anonymized are stored separately by the controller 104.

According to an embodiment, the method 200 further comprises storing the copy of the modified data element to be stored in a first memory area 108 and storing the one or more data portions to be anonymized in a second memory area 110. The copy of the modified data element and one or more data portions to be anonymized are stored separately to enable execution of data deduplication on the modified data element. In conventional technologies, the data elements received are directly stored without parsing of the one or more data portions resulting in no data deduplication.

According to an embodiment, the method 200 further comprises storing the one or more data portions to be anonymized appended to the copy of the modified data element to be stored. The one or more data portions to be anonymized are appended to copy of the modified data element to be stored to enable efficient storing and retrieval of the data elements when needed.

According to an embodiment, the method 200 further comprises generating a corresponding pointer for each of the one or more data portions to be anonymized and storing the copy of the one or more data portions to be anonymized along with the corresponding pointers. The pointer for each of the one or more data portions to be anonymized are generated and stored to enable getting back of the original data (i.e. data element received) during retrieval of the data elements.

According to an embodiment, method 200 comprising the corresponding pointer indicates a location in the data element for the corresponding data portion to be anonymized. The pointer corresponds to an address where the one or more data portions to be anonymized were originated (i.e. in the data element).

According to an embodiment, the method 200 further comprises restoring a data element by receiving the copy of the modified data element to be restored along with the copy of one or more anonymized data portions, generating a restored copy of the data element by extracting the modified data element utilizing deduplication extraction, and inserting the one or more anonymized data portions into the restored copy of the data element. In an example, the controller 104 enables in restoring the data element upon receiving a restore request from a user (via a user device). Based on the restore request, the controller 104 receives the copy of the modified data element to be restored along with the copy of one or more anonymized data portions from the memory. The controller 104 further enables in generating the restored copy of the data element by combining the modified data element with the one or more anonymized data portions. In an example, if the modified data element which was previously stored was duplicate and only address of an original data element was stored, then the original data element is received by the controller 104.

The steps 202 to 214 are only illustrative and other alternatives can also be provided where one or more steps are added, one or more steps are removed, or one or more steps are provided in a different sequence without departing from the scope of the claims herein.

In one aspect, provided is a computer-readable medium carrying computer instructions that when loaded into and executed by a controller 104 of a data storage arrangement (e.g. the data storage arrangement 100A or 100B) enables the data storage arrangement to implement the method 200. Examples of implementation of the computer-readable medium include, but is not limited to, EEPROM, RAM, ROM, HDD, flash memory, a Secure Digital (SD) card, SSD, a computer readable storage medium, and/or CPU cache memory. In another aspect, a computer program product is provided comprising a non-transitory computer-readable storage medium having computer program code stored thereon, the computer program code being executable by a processor to execute the method 200. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

The invention claimed is:

1. A data storage arrangement comprising:
   a memory configured to store one or more data elements; and
   a controller coupled to the memory and configured to:
      receive indication of data to be anonymized;
      receive, from among the one or more data elements, a data element to be stored;
      parse the data element to find one or more data portions to be anonymized;
      generate a first copy of the one or more data portions to be anonymized;
      delete the one or more data portions to be anonymized from the data element to be stored to generate a modified data element to be stored;
      generate a second copy of the modified data element utilizing deduplication;
      append the one or more data portions to be anonymized to the second copy, wherein the second copy includes both the modified data element and appended anonymized data portions; and
      store the second copy along with the first copy in the memory.

2. The data storage arrangement of claim 1, wherein the memory comprises:
   a first memory area; and
   a second memory area, and
   wherein the controller is further configured to:
      store the second copy in the first memory area; and
      store the one or more data portions in the second memory area.

3. The data storage arrangement of claim 1, wherein the controller is further configured to retrieve the modified data element and the appended anonymized data portions based on a defined association.

4. The data storage arrangement of claim 1, wherein the controller is further configured to:
   generate a corresponding pointer for each of the one or more data portions; and
   further store the first copy along with corresponding pointers.

5. The data storage arrangement of claim 4, wherein the corresponding pointer indicates an address of the one or more data portions to be anonymized in the data element.

6. The data storage arrangement of claim 1, wherein the controller is further configured to further parse the data element to find the one or more data portions by finding data portions in data fields specified as fields to be anonymized.

7. The data storage arrangement of claim 1, wherein the controller is further configured to parse the data element to find the one or more data portions by finding data portions having data formats matching anonymous formats.

8. The data storage arrangement of claim 1, wherein the controller is further configured to restore the data element by:
   receiving a third copy of a modified data element to be restored along with a fourth copy of one or more anonymized data portions;
   generating a restored copy of the data element by extracting the modified data element to be restored utilizing deduplication extraction; and
   inserting the one or more anonymized data portions into the restored copy.

9. A method for a data storage arrangement, the method comprising:
   receiving indication of data to be anonymized;
   receiving, from among one or more data elements stored in a memory, a data element to be stored;
   parsing the data element to find one or more data portions to be anonymized;
   generating a first copy of the one or more data portions to be anonymized;
   deleting the one or more data portions to be anonymized from the data element to be stored to generate a modified data element to be stored;
   generating a second copy of the modified data element utilizing deduplication;
   appending the one or more data portions to be anonymized to the second copy, wherein the second copy includes both the modified data element and appended anonymized data portions; and
   storing the second copy along with the first copy in the memory.

10. The method of claim 9, further comprising restoring the data element by:
    receiving a third copy of a modified data element to be restored along with a fourth copy of one or more anonymized data portions;
    generating a restored copy of the data element by extracting the modified data element utilizing deduplication extraction; and
    inserting the one or more anonymized data portions into the restored copy.

11. The method of claim 9, further comprising further parsing the data element to find the one or more data portions by finding data portions in data fields specified as fields to be anonymized.

12. The method of claim 9, further comprising further parsing the data element to find the one or more data portions by finding data portions having data formats matching anonymous formats.

13. A computer program product comprising computer-executable instructions that are stored on a non-transitory computer-readable medium and that, when executed by a controller of a data storage arrangement, cause the data storage arrangement to:
    receive indication of data to be anonymized;
    receive, from among one or more data elements stored in a memory, a data element to be stored;
    parse the data element to find one or more data portions to be anonymized;
    generate a first copy of the one or more data portions to be anonymized;
    delete the one or more data portions to be anonymized from the data element to be stored to generate a modified data element to be stored;
    generate a second copy of the modified data element utilizing deduplication;
    append the one or more data portions to be anonymized to the second copy, wherein the second copy includes both the modified data element and appended anonymized data portions; and
    store the second copy along with the first copy in the memory.

14. The computer program product of claim 13, wherein the computer-executable instructions further cause the data storage arrangement to:
    receive a third copy of a modified data element to be restored along with a fourth copy of one or more anonymized data portions;
    generate a restored copy of the data element by extracting the modified data element utilizing deduplication extraction; and
    insert the one or more anonymized data portions into the restored copy.

15. The computer program product of claim 13, wherein the computer-executable instructions further cause the data storage arrangement to:
    store the second copy in a first memory area of the memory; and
    store the one or more data portions in a second memory area of the memory.

16. The computer program product of claim 13, wherein the computer-executable instructions further cause the data storage arrangement to retrieve the modified data element and the appended anonymized data portions based on a defined association.

17. The computer program product of claim 13, wherein the computer-executable instructions further cause the data storage arrangement to:
    generate a corresponding pointer for each of the one or more data portions; and
    store the first copy along with corresponding pointers.

18. The computer program product of claim 17, wherein the corresponding pointer indicates an address of the one or more data portions to be anonymized in the data element to be stored.

19. The computer program product of claim 13, wherein the computer-executable instructions further cause the data storage arrangement to further parse the data element to be stored to find the one or more data portions by finding data portions in data fields specified as fields to be anonymized.

20. The computer program product of claim 13, wherein the computer-executable instructions further cause the data storage arrangement to further parse the data element to find the one or more data portions by finding data portions having data formats matching anonymous formats.

* * * * *